United States Patent
Wang et al.

(10) Patent No.: US 11,277,747 B2
(45) Date of Patent: Mar. 15, 2022

(54) BASE STATION LOCATION AUTHENTICATION

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 58 days.

(21) Appl. No.: 16/374,722

(22) Filed: Apr. 3, 2019

(65) Prior Publication Data

US 2020/0322805 A1 Oct. 8, 2020

(51) Int. Cl.
*H04W 12/122* (2021.01)
*H04W 4/029* (2018.01)
(Continued)

(52) U.S. Cl.
CPC ........... *H04W 12/122* (2021.01); *G01S 19/46* (2013.01); *H04W 4/029* (2018.02); *H04W 12/037* (2021.01); *H04W 12/041* (2021.01); *H04W 12/06* (2013.01); *H04W 88/023* (2013.01); *H04W 88/10* (2013.01)

(58) Field of Classification Search
CPC ... H04M 7/0078; H04W 4/029; H04W 12/06; H04W 12/08; H04W 12/122; H04W 12/037; H04W 12/041; H04W 88/023; H04W 88/10; G01S 19/46
See application file for complete search history.

(56) References Cited

U.S. PATENT DOCUMENTS

| | | | |
|---|---|---|---|
| 7,113,128 B1 * | 9/2006 | Pitt | G01S 19/05 342/357.42 |
| 8,195,817 B2 * | 6/2012 | Xue | H04W 12/0609 709/229 |

(Continued)

FOREIGN PATENT DOCUMENTS

| | | |
|---|---|---|
| GB | 2551589 | 12/2017 |
| GN | 106211168 | 12/2016 |

OTHER PUBLICATIONS

Gunnarsson et al. (LTE Positioning and RTK: Precision down to the centimeter, Nov. 19, 2018, 8 pages) (Year: 2018).*

(Continued)

*Primary Examiner* — Oleg Korsak
(74) *Attorney, Agent, or Firm* — Colby Nipper PLLC

(57) ABSTRACT

This document describes techniques and apparatuses for base station location authentication. In particular, a base-station-location server 264 provides protection against a Global Navigation Satellite System (GNSS) spoofing attack or a cellular-network spoofing attack by auditing processed locations 504 of base stations 120 within a cellular network. The base-station-location server 264 maintains a list of authenticated base stations, generates a security key 321 for a base station 120 that is authenticated, and sends the security key 321 to the base station 120 in an authentication message 522. The authenticated base station 120 uses the security key 321 to generate an encrypted positioning reference signal that protects timing information and/or a location 504 of the base station 120. The encrypted positioning reference signal also enables a user equipment (UE) to determine that the base station 120 is authenticated by the base-station-location server 264.

20 Claims, 7 Drawing Sheets

(51) Int. Cl.
*G01S 19/46* (2010.01)
*H04W 12/06* (2021.01)
*H04W 88/02* (2009.01)
*H04W 88/10* (2009.01)
*H04W 12/037* (2021.01)
*H04W 12/041* (2021.01)

(56) References Cited

U.S. PATENT DOCUMENTS

| | | | |
|---|---|---|---|
| 8,630,620 B2 | 1/2014 | Cha et al. | |
| 8,630,621 B2* | 1/2014 | Agashe | H04W 64/003 |
| | | | 455/411 |
| 2007/0099598 A1 | 5/2007 | Voyer et al. | |
| 2010/0087166 A1 | 4/2010 | Agashe | |
| 2011/0227787 A1 | 9/2011 | Gum et al. | |
| 2011/0287779 A1 | 11/2011 | Harper | |
| 2012/0208557 A1* | 8/2012 | Carter | G01S 19/23 |
| | | | 455/456.1 |
| 2013/0311764 A1* | 11/2013 | Alpert | H04W 12/033 |
| | | | 713/150 |
| 2014/0009336 A1* | 1/2014 | Ruegamer | G01S 19/215 |
| | | | 342/357.72 |
| 2014/0073303 A1* | 3/2014 | Henderson | H04W 24/02 |
| | | | 455/418 |
| 2014/0097984 A1* | 4/2014 | Stevens | G01S 19/20 |
| | | | 342/357.58 |
| 2014/0100778 A1* | 4/2014 | Bagnall | G01S 19/215 |
| | | | 701/531 |
| 2014/0240170 A1* | 8/2014 | Rudow | G01S 19/42 |
| | | | 342/357.42 |
| 2014/0280645 A1* | 9/2014 | Shuman | H04W 12/068 |
| | | | 709/206 |
| 2014/0349675 A1* | 11/2014 | Schatzberg | G01S 5/02 |
| | | | 455/456.1 |
| 2014/0378171 A1* | 12/2014 | Rudow | H04W 4/027 |
| | | | 455/456.6 |
| 2015/0226858 A1* | 8/2015 | Leibner | H04K 3/90 |
| | | | 342/357.59 |
| 2016/0226886 A1 | 8/2016 | Steiner | |
| 2017/0238140 A9 | 8/2017 | Buchheim et al. | |
| 2018/0217266 A1* | 8/2018 | Kim | G01S 13/933 |
| 2019/0045477 A1* | 2/2019 | Edge | H04W 24/08 |
| 2019/0113625 A1 | 4/2019 | Farmer et al. | |

OTHER PUBLICATIONS

Huang et al. (Identifying the Fake Base Station: A Location Based Approach, IEEE, 4 pages, 2018) (Year: 2018).*
"Security of Home Node B (HNB) / Home evolved Node B (HeNB)", 3GPP TS 33.320 V11.6.0 (Jun. 2012), Jun. 2012, 41 pages.
"International Search Report and Written Opinion", PCT Application No. PCT/US2020/026166, dated Jul. 6, 2020, 17 pages.
Capkun, et al., "Secure Location Verification with Hidden and Mobile Base Stations", IEEE Transactions on Mobile Computing, vol. 7, No. 4, Apr. 2008, Apr. 2008, 14 pages.
"Written Opinion", Application No. PCT/US2020/026166, dated Mar. 5, 2021, 10 pages.
"International Preliminary Report on Patentability", Application No. PCT/US2020/026166, dated Sep. 28, 2021, 10 pages.

* cited by examiner

BASE STATION LOCATION AUTHENTICATION

BACKGROUND

A user equipment (UE) can include a variety of different applications that rely on a location of the UE. For example, a navigation application of the UE provides directions to a user based on its location. The user can also use a locator application of the UE to find their UE or share their UE's location with friends or family. As the user moves to different locations on a map, some augmented reality gaming applications of the UE trigger different events according to the UE's location. The UE can also share its location with emergency responders responsive to the user calling emergency services. There are a variety of different techniques that can determine the location of the UE such that the location can be provided to these applications.

In some cases, the UE includes a Global Navigation Satellite System (GNSS) receiver and employs trilateration techniques to determine its location. Sometimes, however, it may be challenging or inconvenient to use these techniques. At some locations, for example, the UE may be unable to detect GNSS signals or may be unable to detect GNSS signals from more than two GNSS satellites, which can decrease an accuracy of a determined location. Also, a time to acquire the GNSS signals from a cold start may be longer than desirable to provide fast feedback to the user, the UE application, or emergency responder. Additionally or alternatively, the UE can use a cellular-network location service provided by a cellular network to determine its location. The cellular-network location can augment a GNSS location or provide a temporary substitute location during time periods in which the GNSS signals are unavailable.

Both GNSS techniques and current cellular-network location services may, however, be vulnerable to spoofing attacks. Without appropriate security measures, a third party can impersonate or compromise a GNSS satellite or a base station within the cellular network, and cause the UE to determine an inaccurate location. Without a way to counteract or detect these spoofing attacks, the user can unknowingly be directed to an unintended location, a self-driving system (e.g., a vehicle or a drone) can be steered off course, or emergency responders can receive inaccurate location information.

SUMMARY

Techniques and apparatuses are described for base station location authentication. In particular, a base-station-location server provides protection against a Global Navigation Satellite System (GNSS) attack or a cellular-network spoofing attack to prevent a user equipment (UE) from determining an inaccurate location. The base-station-location server audits locations of base stations within the cellular network by comparing a location determined by the base station to one or more locations determined by the base-station-location server using information provided by one or more sources. The base-station-location server maintains a list of authenticated base stations and generates security keys for base stations that are authenticated. The authenticated base stations use the security keys to generate encrypted positioning reference signals that protect information transmitted to the UE and enable the UE to verify that the base stations are authenticated by the base-station-location server. With this authentication, the UE can use cellular-network location services provided by authenticated base stations to determine an accurate cellular-network location. The UE can further audit its GNSS location by comparing the GNSS location to the cellular-network location. In this manner, the UE is protected from spoofing attacks that can otherwise cause the UE to provide false or misleading location information to the user.

Aspects described below include a method performed by a base-station-location server. The method includes the base-station-location server receiving a first processed location of a base station from the base station. The method also includes the base-station-location server determining a first location of the base station based on first information from a first source. The method further includes the base-station-location server authenticating the base station based on a first comparison of the processed location to the first location.

Aspects described below also include a base station configured to determine a processed location of the base station. The base station is also configured to communicate the processed location to a base-station-location server. The base station is further configured to receive a security key from the base-station-location server. Using the security key, the base station is configured to generate an encrypted positioning reference signal. The base station is also configured to transmit the encrypted positioning reference signal to one or more user equipment (UE) to provide a cellular-network location service.

Aspects described below also include a user equipment (UE) configured to establish a secure communication with a base-station-location server and receive base-station-authentication information from the base-station-location server. The UE is also configured to receive encrypted information from the base station as part of a cellular-network location service. The UE is further configured to determine that the base station is authenticated by the base-station-location server based on the base-station-authentication information. Responsive to a determination that the base station is authenticated, the UE is configured to determine a cellular-network location of the UE based on the encrypted information.

Aspects described below also include a system with means for authenticating a location of a base station.

BRIEF DESCRIPTION OF THE DRAWINGS

Apparatuses of and techniques for base station location authentication are described with reference to the following drawings. The same numbers are used throughout the drawings to reference like features and components.

DETAILED DESCRIPTION

Overview

This document describes techniques and devices for base station location authentication. A location of a user equipment (UE) can be determined using Global Navigation Satellite System (GNSS) techniques or cellular-network location services. Both the GNSS techniques and current cellular-network location services may be vulnerable to spoofing attacks. Without appropriate security measures, a third party can impersonate or compromise a GNSS satellite or a base station, and cause the UE to determine an inaccurate location.

To address these vulnerabilities, techniques and apparatuses are described for base station location authentication. In particular, a base-station-location server provides protection against a GNSS attack or a cellular-network spoofing attack to prevent a UE from determining an inaccurate location. The base-station-location server audits locations of base stations within the cellular network by comparing a location determined by the base station to one or more locations determined by the base-station-location server using information provided by one or more sources. The base-station-location server maintains a list of authenticated base stations and generates security keys for base stations that are authenticated. The authenticated base stations use the security keys to generate encrypted positioning reference signals that protect information transmitted to the UE and enable the UE to verify that the base stations are authenticated by the base-station-location server. With this authentication, the UE can use cellular-network location services provided by authenticated base stations to determine an accurate cellular-network location. The UE can further audit its GNSS location by comparing the GNSS location to the cellular-network location. In this manner, the UE is protected from spoofing attacks that can otherwise cause the UE to provide false or misleading location information to the user. Example spoofing attacks are further described with respect to FIG. 1.

Figure 1:
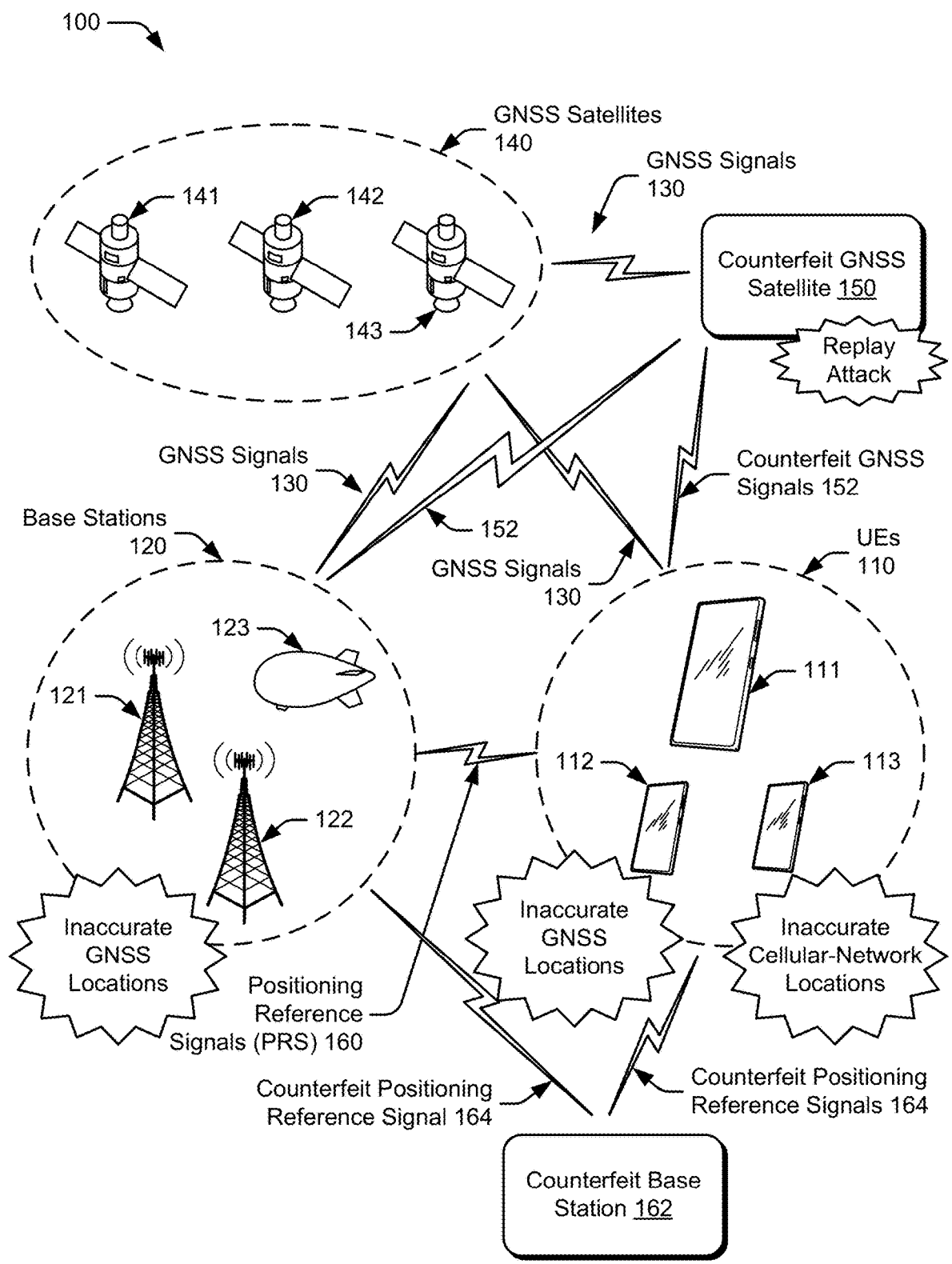
FIG. 1 illustrates an example wireless network environment subject to a GNSS spoofing attack and a cellular-network spoofing attack.

FIG. 1 illustrates an example environment 100 that is subject to a GNSS spoofing attack and a cellular-network spoofing attack. The environment 100 includes multiple UEs 110, illustrated as UE 111, UE 112, and UE 113, which can communicate with one or more terrestrial or non-terrestrial base stations 120 (shown as base station 121, base station 122, and base station 123). The base stations 121 and 122 represent stationary base stations, such as cell towers, and the base station 123 represents a moving base station, such as a balloon, a drone, a high-altitude platform station, or a satellite. The UEs 110 and the base stations 120 include GNSS receivers, which detect GNSS signals 130 from multiple GNSS satellites 140 (illustrated as satellite 141, satellite 142, and satellite 143). By processing the GNSS signals 130, the UEs 110 and the base stations 120 determine their locations using trilateration or multilateration.

In some cases, however, a counterfeit GNSS satellite 150 executes a replay attack and generates counterfeit GNSS signals 152 based on the GNSS signals 130. The counterfeit GNSS signals 152 represent time-adjusted versions of the GNSS signals 130 (e.g., forwarded or delayed versions of the GNSS signals 130). Due to the timing adjustments, the counterfeit GNSS signals 152 cause the UEs 110 and the base stations 120 to measure inaccurate distances to the GNSS satellites 140. Consequently, the UEs 110 and the base stations 120 determine inaccurate GNSS locations. In the case of the UEs 110, the inaccurate GNSS locations are provided to applications of the UEs, which can unintentionally misinform users about the UEs' 110 locations.

In some cases, the GNSS satellites 140 employ cryptography to enable the UEs 110 and the base stations 120 to authenticate the GNSS signals 130. Example types of authentication techniques include Chips-Message Robust Authentication (Chimera), Timed Efficient Streamed Loss-Tolerant Authentication (TESLA) (e.g., Open Service Navigation Message Authentication (OSNMA)), or Spreading Code Encryption (SCE). These authentication techniques, however, are vulnerable to the replay attack and do not enable the UEs 110 and the base stations 120 to distinguish the GNSS signals 130 from the counterfeit GNSS signals 152.

Instead of determining locations using GNSS techniques, the UEs 110 can alternatively use cellular-network location services to determine cellular-network locations. Different types of cellular-network location services include network-based location services (e.g., cell ID (CID)), handset-based location services (e.g., Enhanced-Observed Time Difference (E-OTD)), or hybrid-based location services (e.g., Assisted GNSS (A-GNSS), Observed Time Difference of Arrival (OTDOA), or Enhanced-Cell ID (E-CID)). To provide these cellular-network location services, the base stations 120 transmit positioning reference signals (PRS) 160 to the UEs 110. Similar to the GNSS signals 130, the positioning reference signals 160 enable the UEs' 110 cellular-network locations to be determined using trilateration or multilateration techniques. In general, the UEs 110 generate measurement data based on the positioning reference signals 160 and the measurement data is indicative of distances between the base stations 120 and a UE 110.

The cellular-network location services use locations of the base stations 120 to determine the cellular-network locations of a UE 110. As such, if the locations of the base stations 120 are inaccurate due the counterfeit GNSS satellite 150's replay attack, inaccurate cellular-network locations are determined for the UEs 110. Alternatively or additionally, a counterfeit base station 162 generates counterfeit positioning reference signals 164, which cause inaccurate cellular-network locations to be determined for a UE 110. Some cellular-network location services include additional types of vulnerabilities, such as reliance upon an external database, which can be exploited or compromised by a third party. To address these vulnerabilities, a cellular network includes a base-station-location server, which can at least partially implement base station location authentication, as further described with respect to FIG. 2.

Example Environment

Figure 2:
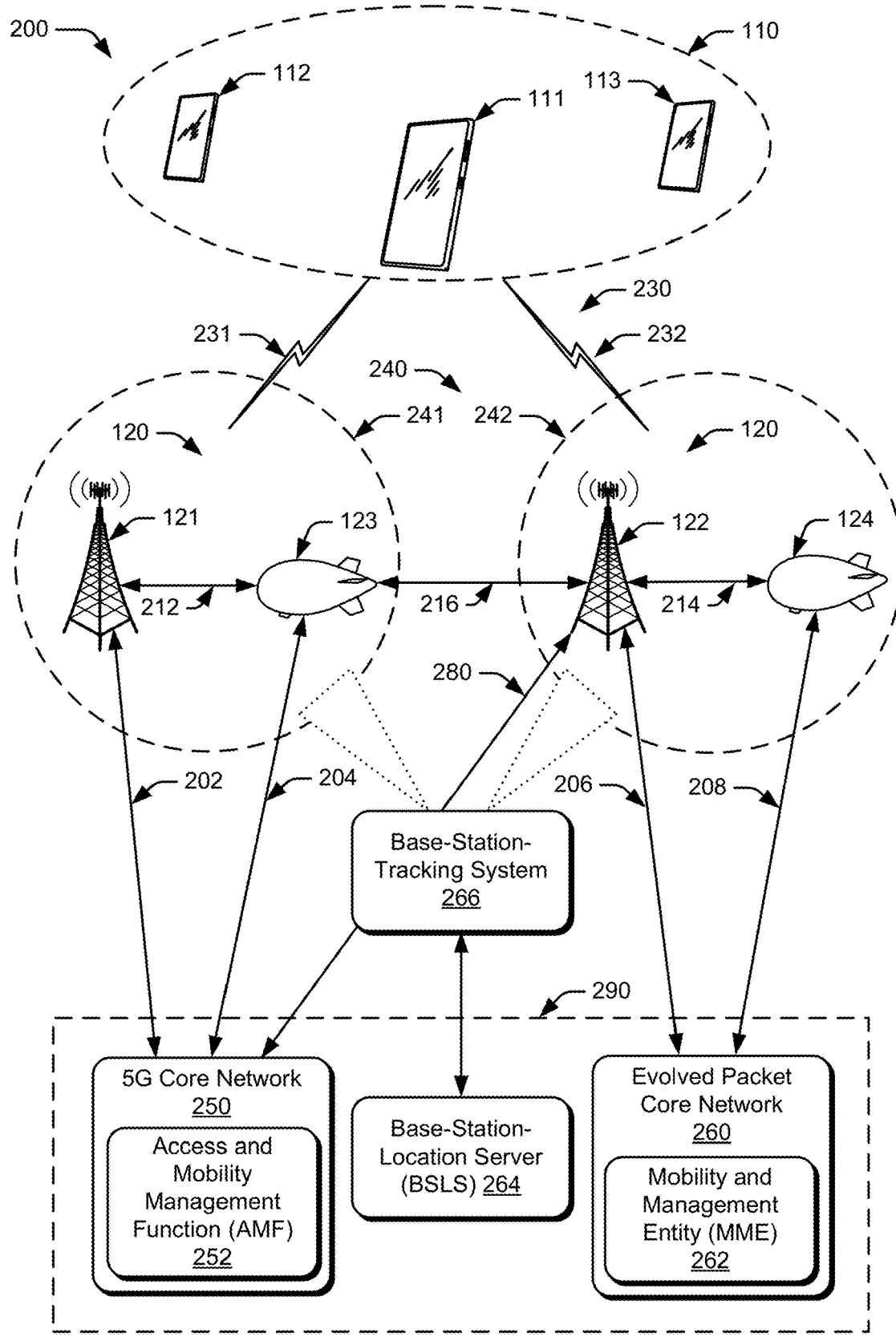
FIG. 2 illustrates an example wireless network environment in which base station location authentication can be implemented.

FIG. 2 illustrates an example environment 200 in which base station location authentication can be implemented. In the depicted environment 200, each UE 110 communicates with one or more base stations 120 (illustrated as base stations 121, 122, 123, and 124) through one or more wireless communication links 230 (wireless link 230) (shown as wireless links 231 and 232). Although illustrated as a smallphone, the UE 110 can be implemented as any suitable computing or electronic device, such as a mobile communication device, a modem, a cellular phone, a gaming device, a navigation device, a media device, a laptop computer, a desktop computer, a tablet computer, a smart appliance, a vehicle-based communication system, and the like. The base station 120 (e.g., an Evolved Universal Terrestrial Radio Access Network Node B, E-UTRAN Node B, evolved Node B, eNodeB, eNB, Next Generation Evolved Node B, ng-eNB, Next Generation Node B, gNode B, gNB, or the like) can be implemented in a macrocell, microcell, small cell, picocell, or the like, or any combination thereof.

The base stations 120 communicate with the UE 110 using the wireless links 231 and 232, which can be implemented as any suitable type of wireless link. The wireless links 231 and 232 can include a downlink of data and control information communicated from the base station 120 to the UE 110, an uplink of other data and control information communicated from the UE 110 to the base stations 120, or both. The wireless links 230 include one or more wireless links or bearers implemented using any suitable communication protocol or standard, or combination of communication protocols or standards such as 3rd Generation Partnership Project Long-Term Evolution (3GPP LTE), Enhanced Long-Term Evolution (eLTE), Fifth-Generation New Radio (5G NR), Fourth-Generation (4G) standard, and so forth. Multiple wireless links 230 can be aggregated in a carrier aggregation to provide a higher data rate for the UE 110. Multiple wireless links 230 from multiple base stations 120 can be configured for Coordinated Multipoint (CoMP) communication with the UE 110.

The base stations 120 are collectively a Radio Access Network 240 (RAN, Evolved Universal Terrestrial Radio Access Network, E-UTRAN, 5G NR RAN or NR RAN). The RANs 240 are illustrated as a NR RAN 241 and an E-UTRAN 242. In FIG. 2, a core network 290 is shown to include a Fifth-Generation Core (5GC) network 250 (5GC 250) and an Evolved Packet Core (EPC) network 260 (EPC 260), which are different types of core networks. The base stations 121 and 123 in the NR RAN 241 are connected to the 5GC 250. The base stations 122 and 124 in the E-UTRAN 242 are connected to the EPC 260. Optionally or additionally, the base station 122 connects to both the 5GC 250 and the EPC 260.

The base stations 121 and 123 connect, at 202 and 204 respectively, to the 5GC 250 using an NG2 interface for control-plane signaling and using an NG3 interface for user-plane data communications. The base stations 122 and 124 connect, at 206 and 208 respectively, to the EPC 260 using an S1 interface for control-plane signaling and user-plane data communications. If the base station 122 connects to both the 5GC 250 and the EPC 260, the base station 122 can connect to the 5GC 250 using an NG2 interface for control-plane signaling and using an NG3 interface for user-plane data communications, at 280. In addition to connections to the core networks 290, the base stations 120 can communicate with each other. The base stations 121 and 123 communicate using an Xn interface at 212, for instance. The base stations 122 and 124 communicate using an X2 interface at 214.

The 5GC 250 includes an Access and Mobility Management Function 252 (AMF 252) that provides control-plane functions such as registration and authentication of multiple UE 110, authorization, mobility management, or the like in the 5G NR network. The EPC 260 includes a Mobility Management Entity 262 (MME 262) that provides control-plane functions such as registration and authentication of multiple UE 110, authorization, mobility management, or the like in the E-UTRA network. The AMF 252 and the MME 262 communicate with the base stations 120 in the RANs 240 and also communicate with multiple UE 110 through the base stations 120.

The core network 290 also includes a base-station-location server 264 (BSLS 264). The base-station-location server 264 audits locations of the base stations 120 and determines whether or not the locations of the base stations 120 are authentic. Additionally, the base-station-location server 264 generates security keys for the authenticated base stations to encrypt positioning reference signals. By encrypting the positioning reference signals that are transmitted for cellular-network location services, information carried by the positioning reference signals is protected (e.g., secured) and the UEs 110 can determine if the base stations 120 are authenticated by the base-station-location server 264.

Generally, the base-station-location server 264 communicates with the AMF 252 or the MME 262 or accesses information and functions of the AMF 252 or the MME 262. The base-station-location server 264 can also establish secure communications with the base stations 120 and the UEs 110 using cellular-network security techniques, public-key cryptography (e.g., asymmetric cryptography), or a tunneling protocol.

In some cellular networks, the base-station-location server 264 communicates with other external entities. For example, the base-station-location server 264 communicates with the GNSS to receive public keys or security certificates for GNSS authentication techniques. In some situations, the base-station-location server 264 includes a GNSS receiver and receives the public keys from the GNSS receiver. In other situations, the base-station-location server 264 receives the public keys from one or more authenticated base stations that include GNSS receivers.

If a base-station-tracking system 266 is deployed, the base-station-location server 264 can also establish communication with the base-station-tracking system 266 to receive location information of the base stations 120. The base-station-tracking system 266 identifies the base stations 120 and measures locations of the base stations 120 using at least one sensor, such as a radar sensor or an optical sensor. In some implementations, the base-station-tracking system 266 is airborne and implemented using satellites, drones, or balloons. In other implementations, the base-station-tracking system 266 includes a network of sensors that are positioned at different locations with visibility to the cellular network's base stations 120. The base-station-location server 264 is further described with respect to FIG. 3.

Figure 3:
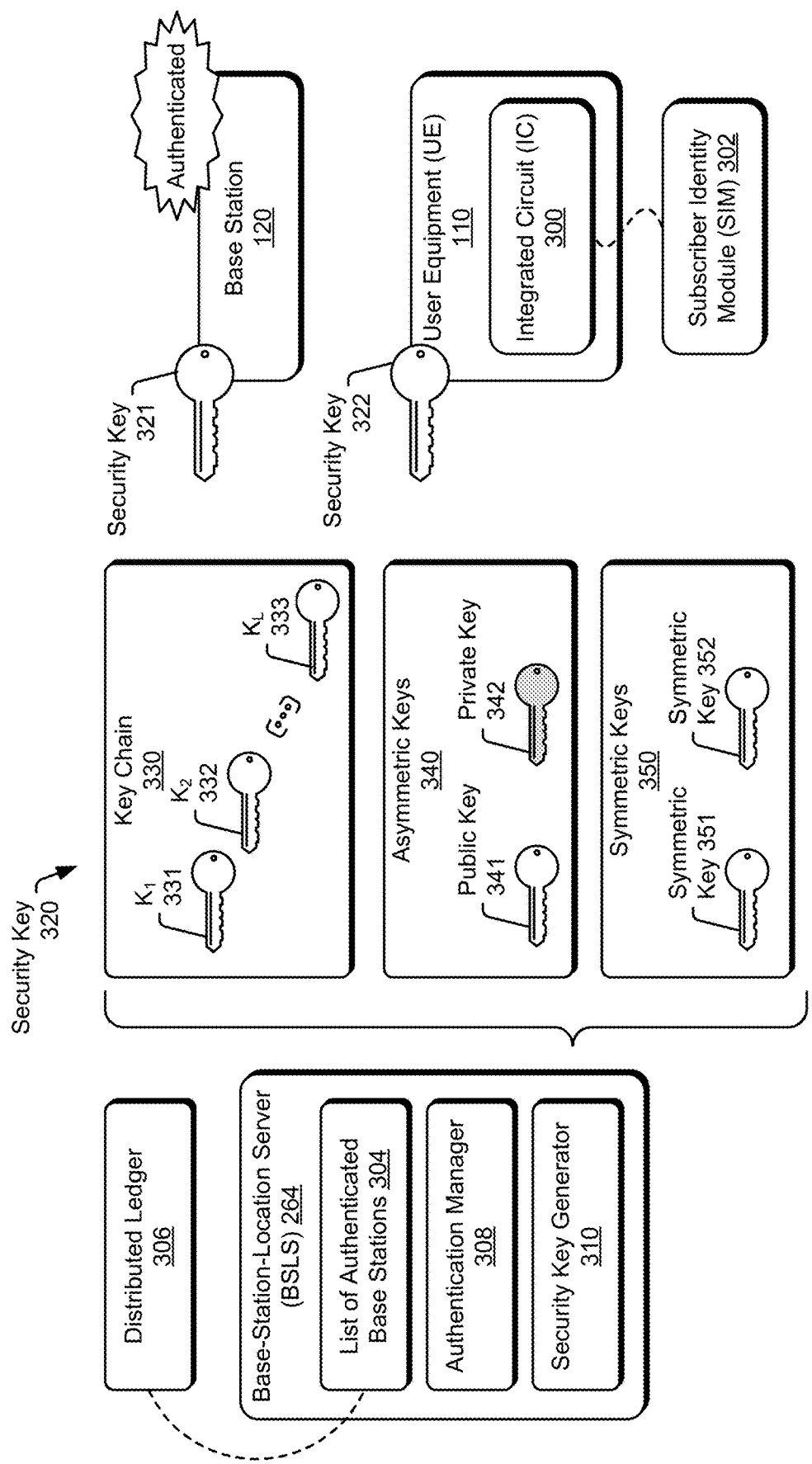
FIG. 3 illustrates example entities for base station location authentication.

FIG. 3 illustrates example entities for base station location authentication. These entities include the UE 110, the base station 120, and the base-station-location server 264. In the depicted configuration, the UE 110 includes an integrated circuit (IC) 300, which can be implemented as a subscriber identity module (SIM) 302 (e.g., a SIM card). The integrated circuit 300 can securely store information to enable the UE 110 to determine whether or not a base station 120 is authenticated by the base-station-location server 264.

The base-station-location server 264 generates and maintains a list of authenticated base stations 304. In addition to identifying which base stations 120 of the cellular network are authenticated, the list of authenticated base stations 304 can optionally include times at which the base stations 120 were last authenticated by the base-station-location server 264, locations of the base stations 120, and sources that the base-station-location server 264 used to authenticate the base stations 120.

In some implementations, the base-station-location server 264 includes multiple public or private entities (e.g., multiple servers or multiple databases) and the list of authenticated base stations 304 is implemented as a distributed ledger 306. In this manner, the list of authenticated base stations 304 can be maintained, updated, and secured using distributed techniques such as blockchain. In other implementations, the base-station-location server 264 includes a server that is physically located at a secure location (e.g., located within a locked room), which permits access to authorized people. By securing the base-station-location server 264 physically or through the use of distributed techniques, it can be challenging for a third party to tamper with the base-station-location server 264 or corrupt the list of authenticated base stations 304.

The base-station-location server 264 includes an authentication manager 308 and an security key generator 310. The authentication manager 308 audits locations of the base stations 120 and updates the list of authenticated base stations 304 accordingly. In particular, the authentication manager 308 authenticates a processed location of the base station 120 by determining one or more locations of the base station 120 based on information from one or more sources. A discrepancy between the processed location determined by the base station and the one or more of the locations determined by the base-station-location server 264 can be indicative of a spoofing attack. Responsive to detecting this discrepancy, the authentication manager 308 does not authenticate the base station 120 and does not add the base station 120 to the list of authenticated base stations 304. Alternatively, if the location of the base station 120 is authenticated, the authentication manager 308 adds the base station 120 to the list of authenticated base stations 304 to indicate successful authentication.

The authentication manager 308 continually monitors the location of the base station 120 and performs subsequent audits. In situations in which the base station 120 was previously added to the list of authenticated base stations 304, the authentication manager 308 continues to include the base station 120 within the list of authenticated base stations 304 if the base station 120 continues to be successfully authenticated. However, if the authentication manager 308 is unable to authenticate the base station 120, the authentication manager 308 removes the base station 120 from the list of authenticated base stations 304. At a later time, the base station 120 can be authenticated by the authentication manager 308 and added back to the list of authenticated base stations 304.

The security key generator 310 generates one or more security keys 320 (e.g., numbers) and provides at least one security key 321 to a base station 120 that is included within the list of authenticated base stations 304. In some cases, the security key generator 310 generates unique security keys 320 for each base station 120. In other cases, a same security key 320 can be re-used or provided to multiple base stations 120. The security keys 320 enable an authenticated base station to encrypt timing and/or location information within a positioning reference signal 160 and inform the UE 110 that the base station 120 is authenticated by the base-station-location server 264.

The security key generator 310 also generates a security key 322, which is provided to the UE 110. In some cases, a network provided includes the security key 322 within the integrated circuit 300 (e.g., the SIM 302). In other cases, the base-station-location server 264 establishes a secure communication with the UE 110 using an authenticated base station and sends the security key 322 to the UE 110. The UE 110 stores the security key 322 in the integrated circuit 300 or a computer-readable storage media (CRM) (e.g., CRM 412 of FIG. 4) of the UE 110.

The security key generator 310 can generate a variety of different types of security keys 320 for a variety of different types of cryptography. For instance, the security key generator 310 generates a key chain 330 using a one-way function, such as a hash function. The key chain 330 includes multiple security keys, illustrated as key $K_1$ 331, key $K_2$ 332, and key $K_L$ 333. Due to the one-way function, later keys of the key chain 330 (e.g., key $K_L$ 333) are relatively easy (e.g., computationally efficient) to derive from previous keys of the key chain 330 (e.g., key $K_1$ 331 or key $K_2$ 332). However, it is challenging (e.g., computationally inefficient) to derive a previous key from a later key. Therefore, the security key generator 310 can securely issue keys to the base station 120 in a reverse order and the UE 110 can verify a previous key using a current key.

As another example, the security key generator 310 generates a pair of asymmetric keys 340, which includes a public key 341 and a private key 342 that are mathematically linked and differ from one another. To generate the asymmetric keys 340, the security key generator 310 can employ a variety of different types of asymmetric-key generation algorithms, including a Rivest-Shamir-Adleman (RSA) algorithm, a Diffie-Hellman key exchange, elliptic curve cryptography (ECC) (e.g., elliptic curve digital signature algorithm (ECDSA)), and so forth. In general, it is computationally efficient to generate the public key 341 given the private key 342. However, it is computationally inefficient to derive the private key 342 from the public key 341. As such, the public key 341 can be distributed and shared with other entities (e.g., the UE 110) without exposing the private key 342. Due to the mathematical relationship between the public key 341 and the private key 342, messages encrypted with the public key 341 can be decrypted using the private key 342, or vice versa. The asymmetric keys 340 are respectively distributed to the UE 110 and the base station 120.

In yet another example, the security key generator 310 generates a pair of symmetric keys 350, which includes a symmetric key 351 and a symmetric key 352 that are identical or linked by a mathematical transformation that enables each key to be derived from the other key. To generate the symmetric keys 350, the security key generator 310 can employ a variety of different types of symmetric-key generation algorithms, such as those that relate to the Advanced Encryption Standard (AES). The symmetric keys 350 are respectively distributed to the UE 110 and the base station 120.

By auditing the location of the base station 120 over time, the base-station-location server 264 can identify a compromised base station that has moved unexpectedly or is subject to a GNSS spoofing attack. The base-station-location server 264 can also detect a counterfeit base station 162 that intentionally provides an inaccurate location to the authentication manager 308. These types of base stations are identified as unauthenticated base stations and the security key generator 310 does not provide security keys 320 to the unauthenticated base stations. Without the security keys 320, the UE 110 determines that the base station 120 is not authenticated by the base-station-location server 264 and therefore does not use a positioning reference signal 160 transmitted by the unauthenticated base station to determine a cellular-network location. The UE 110 and the base station 120 are further described with respect to FIG. 4.

Example Devices

Figure 4:
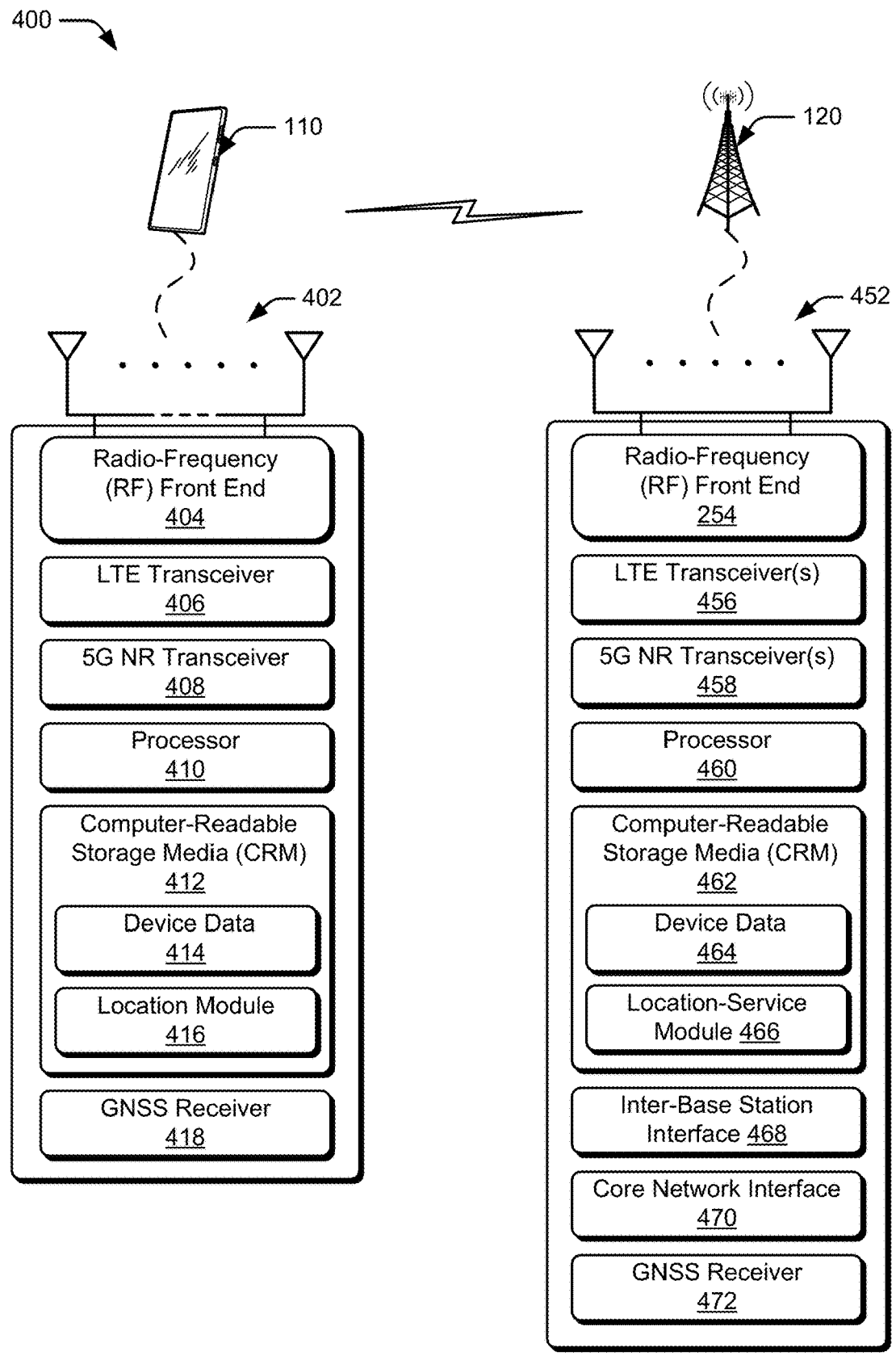
FIG. 4 illustrates an example device diagram of a user equipment and a base station for base station location authentication.

FIG. 4 illustrates an example device diagram 400 of the UE 110 and the base station 120. The UE 110 and the base station 120 can include additional functions and interfaces omitted from FIG. 4 for the sake of clarity. The UE 110 includes antennas 402, a radio-frequency (RF) front end 404, an LTE transceiver 406, and a 5G NR transceiver 408 for communicating with one or more base stations 120 in the RAN 240. The RF front end 404 couples or connects the LTE transceiver 406 and the 5G NR transceiver 408 to the antennas 402 to facilitate various types of wireless communication. The antennas 402 can include an array of multiple antennas that are configured similar to or differently from each other. The antennas 402 and the RF front end 404 can be tuned to one or more frequency bands defined by the 3GPP LTE and 5G NR communication standards and implemented by the LTE transceiver 406 and/or the 5G NR transceiver 408. Additionally, the antennas 402, the RF front end 404, the LTE transceiver 406, and/or the 5G NR transceiver 408 can support beamforming for the transmission and reception of signals with the base station 120. By way of example and not limitation, the antennas 402 and the RF front end 404 are implemented for operation in sub-gigahertz bands, sub-6 GHz bands, and/or above 6 GHz bands that are defined by the 3GPP LTE and 5G NR communication standards.

The UE 110 also includes one or more processors 410 and computer-readable storage media 412 (CRM 412). The processor 410 may be a single core processor or a multiple core processor composed of a variety of materials, such as silicon, polysilicon, high-K dielectric, copper, and so on. The computer-readable storage media described herein excludes propagating signals and the CRM 412 includes any suitable memory or storage device, such as random-access memory (RAM), static RAM (SRAM), dynamic RAM (DRAM), non-volatile RAM (NVRAM), read-only memory (ROM), or Flash memory useable to store device data 414 of the UE 110. The device data 414 includes user data, multimedia data, beamforming codebooks, applications, and/or an operating system of the UE 110, which are executable by the processor 410 to enable user-plane communication, control-plane signaling, and user interaction with the UE 110.

The CRM 412 also includes a location module 416. Alternately or additionally, the location module 416 may be implemented in whole or part as hardware logic or circuitry integrated with or separate from other components of the UE 110. The location module 416 determines a cellular-network location of the UE 110 using a cellular-network location service. The location module 416 also determines whether a base station 120 that transmits a positioning reference signal 160 for the cellular-network location service is authenticated by the base-station-location server 264, as further described with respect to FIG. 6.

The UE 110 can optionally include a GNSS receiver 418 to enable the location module 416 to determine a GNSS location of the UE 110. In some cases, the location module 416 verifies a GNSS location based on the cellular-network location. If the GNSS location significantly differs from the cellular-network location, the location module 416 determines that the GNSS location is an inaccurate GNSS location. The location module 416 provides the cellular-network location or the GNSS location to one or more applications of the UE 110, such as a navigation application, a fitness tracking application, a locator application, an augmented reality gaming application, or an emergency service location application.

The device diagram for the base station 120 includes a single network node (e.g., a gNB). The functionality of the base station 120 can be distributed across multiple network nodes or devices and can be distributed in any fashion suitable to perform the functions described herein. The base station 120 includes antennas 452, a radio-frequency (RF) front end 454, one or more LTE transceivers 456, and/or one or more 5G NR transceivers 458 for communicating with the UE 110. The RF front end 454 couples or connects the LTE transceivers 456 and the 5G NR transceivers 458 to the antennas 452 to facilitate various types of wireless communication. The antennas 452 can include an array of multiple antennas that are configured similar to or differently from each other. The antennas 452 and the RF front end 454 can be tuned to one or more frequency bands defined by the 3GPP LTE and 5G NR communication standards, and implemented by the LTE transceivers 456, and/or the 5G NR transceivers 458. Additionally, the antennas 452, the RF front end 454, the LTE transceivers 456, and/or the 5G NR transceivers 458 can support beamforming, such as Massive-MIMO, for the transmission and reception of communications with the UE 110.

The base station 120 also includes one or more processors 460 and computer-readable storage media 462 (CRM 462). The processor 460 may be a single core processor or a multiple core processor composed of a variety of materials, such as silicon, polysilicon, high-K dielectric, copper, and so on. CRM 462 may include any suitable memory or storage device as described with respect to the CRM 412. The CRM 462 stores device data 464 of the base station 120. The device data 464 includes network scheduling data, radio resource management data, beamforming codebooks, applications, and/or an operating system of the base station 120, which are executable by the processor 460 to enable communication with the UE 110. Additionally, the device data 464 can include a location of the base station 120, such as a surveyed location determined during installation, a determined GNSS location of the base station 120, or trajectory information if the base station 120 is a moving base station.

The CRM 462 also includes a base station manager (not shown) and a location-service module 466. Alternately or additionally, the base station manager or the location-service module 466 can be implemented in whole or part as hardware logic or circuitry integrated with or separate from other components of the base station 120. In at least some aspects, the base station manager configures the LTE transceivers 456 and the 5G NR transceivers 458 for communication with the UE 110, as well as communication with the 5GC 250.

The location-service module 466 determines a location of the base station 120 and generates positioning reference signals 160 for cellular-network location services. The location-service module 466 also receives one or more security keys 320 from the base-station-location server 264 responsive to the base-station-location server 264 authenticating the base station 120. Operations of the location-service module 466 are further described with respect to FIG. 6.

The base station 120 includes an inter-base station interface 468, such as an Xn and/or X2 interface, to exchange user-plane and control-plane data with another base station 120 and manage communications between the base stations 120 with the UE 110. The base station 120 also includes a core network interface 470 to exchange information with core network functions and entities, such as those associated with the 5GC 250.

Optionally, the base station 120 includes a GNSS receiver 472 or is co-located with the GNSS receiver 472. The GNSS receiver 472 collects raw samples of the GNSS signals 130 and provides the raw samples to the location-service module 466. The location-service module 466 analyzes the raw samples to determine a GNSS location of the base station 120. Operations of the UE 110, the base station 120, and the base-station-location server 264 are further described with respect to FIGS. 5 and 6.

Base Station Location Authentication

Figure 5:
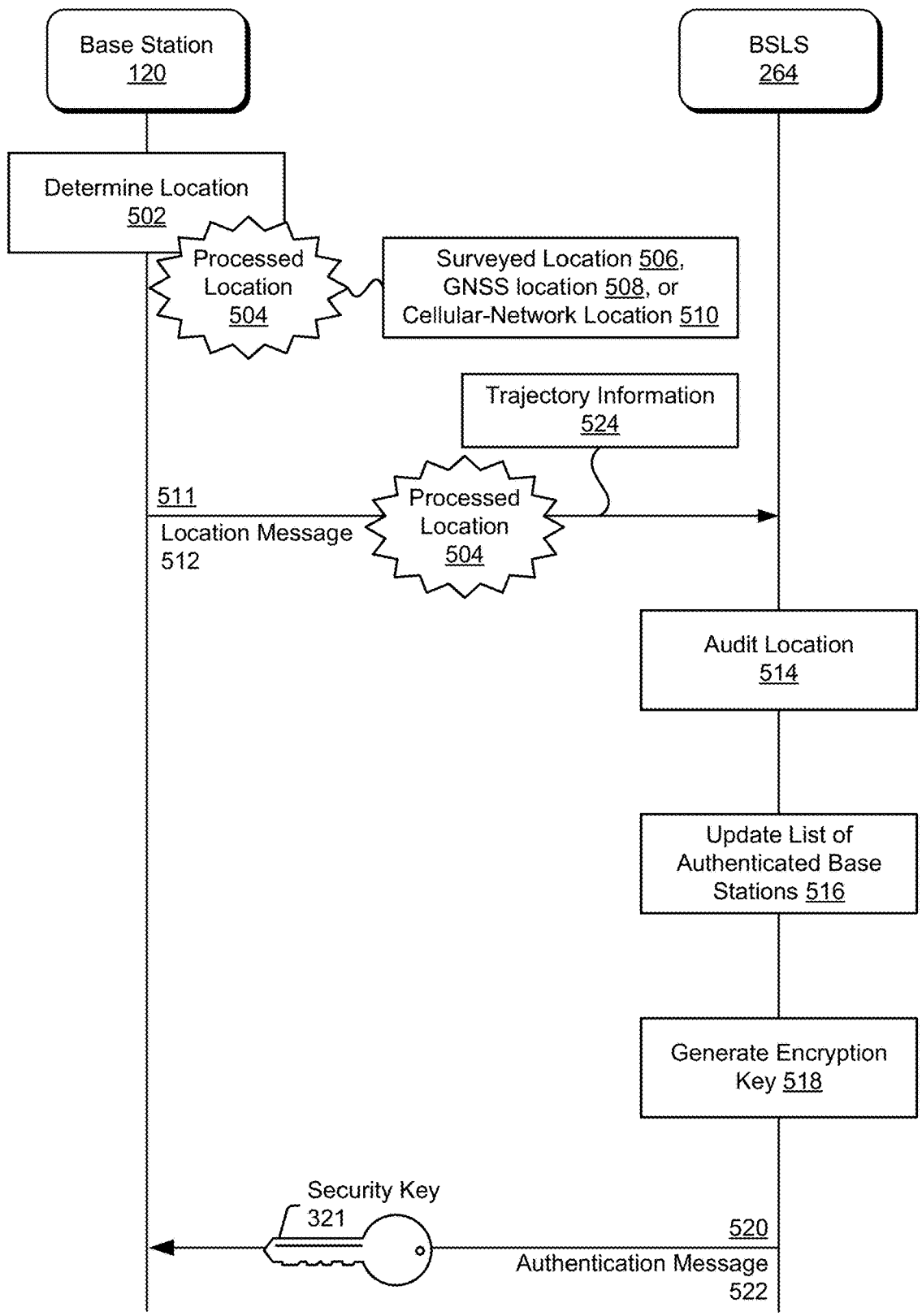
FIG. 5 illustrates details of example data transactions between a base station and a base-station-location server for base station location authentication.

FIG. 5 illustrates details of example data transactions between the base station 120 and the base-station-location server 264 for base station location authentication. The operations described below can be performed responsive to an installation of the base station 120, a UE 110's request for a cellular-network location service, or a periodic or aperiodic request by the base-station-location server 264 to audit the base station 120.

At 502, the base station 120 determines its location 504, which is referred to herein as a processed location 504. Different coordinate systems can be used to represent the processed location 504. In some instances, the processed location 504 is an absolute position of the base station 120 according to a particular coordinate system, such as a geographic or projected coordinate system. In other instances, the processed location 504 is a relative position according to a particular position whose coordinates are known.

The processed location 504 can be a surveyed location 506, a GNSS location 508, or a cellular-network location 510. The location-service module 466 can, for example, retrieve the surveyed location 506 from the CRM 462 in cases that the surveyed location 506 is programmed by an installer or the network provider. If the base station 120 is co-located with or includes the GNSS receiver 472, the location-service module 466 analyzes GNSS data provided by the GNSS receiver 472 to determine the GNSS location 508 of the base station 120. In cases in which the surveyed location 506 is unavailable or the GNSS location 508 cannot be determined (e.g., due to an absence of the GNSS receiver 472 or due to degraded GNSS signal reception), the location-service module 466 requests a cellular-network location service from neighboring base stations to determine the cellular-network location 510. In this case, the location-service module 466 determines the cellular-network location 510 by analyzing positioning reference signals 160 received from the neighboring base stations. Alternatively, the base station 120 transmits positioning reference signals 160 to the neighboring base stations and analyzes data received from the neighboring base stations to determine the cellular-network location 510.

At 511, the base station 120 sends a location message 512 to the base-station-location server 264. The location message 512 includes the processed location 504 determined at 502, such as the surveyed location 506, the GNSS location 508, or the cellular-network location 510. If the base station 120 is a moving base station, the location message 512 can also include trajectory information 524 of the base station 120 to inform the base-station-location server 264 of expected future locations. The trajectory information 524 can include a set of times, location vectors, and velocity vectors.

Although not explicitly shown, sometimes the base station 120 receives a request from the base-station-location server 264 to provide raw samples of the GNSS signals 130 or raw samples of the positioning reference signals 160 that are received by the base station 120 or the neighboring base stations as part of the cellular-network location service. Accordingly, the base station 120 sends the requested samples to the base-station-location server 264 using the location message 512 or another, separate message.

If the base station 120 is compromised or if the base station 120 is a counterfeit base station 162, the processed location 504 provided to the base-station-location server 264 through the location message 512 can be an inaccurate location. The surveyed location 506 of a compromised base station can, for example, be changed to an inaccurate location or the base station 120 can be moved to a different location thereby invalidating the surveyed location 506 stored by the base station 120. In other cases, the GNSS location 508 of the base station 120 is inaccurate due to a replay attack by the counterfeit GNSS satellite 150. Likewise, the cellular-network location 510 can be inaccurate due to the base station 120 requesting a cellular-network location service from a neighboring base station that is a counterfeit base station 162 or based on another feature of the cellular-network location service being compromised by a third party. The base-station-location server 264, however, is able to detect a spoofing attack that has compromised the processed location 504 by comparing the independently determined location to the processed location 504.

At 514, the base-station-location server 264 audits the processed location 504 of the base station 120. In particular, the authentication manager 308 independently determines one or more locations of the base station 120 using information from one or more sources. In some implementations, the information passes from the source, through the base station 120, and to the base-station-location server 264. The different sources can include the base-station-location server 264, the GNSS receiver 472 of the base station 120, authenticated neighboring base stations, the base-station-tracking system 266, a previously-authenticated location of the base station 120, or the trajectory information 524, as further described below.

In one example, the authentication manager 308 retrieves a surveyed location 506 that is stored by the base-station-location server 264. In this case, the surveyed location 506 is previously provided to the base-station-location server 264 by an authorized person that has permission to access the base-station-location server 264, such as the installer of the base station 120 or the network provider. Because the base-station-location server 264 is secured using either distributed techniques or physical security, the surveyed location 506 stored within the base-station-location server 264 has a lower probability of being compromised relative to the surveyed location 506 stored by the base station 120.

In a second example, the base-station-location server 264 receives, directly from the GNSS receiver 472 or indirectly through the base station 120, raw samples of the GNSS signals 130 that are collected by the GNSS receiver 472. The authentication manager 308 determines the GNSS location 508 based on the raw samples and authenticates the GNSS signals 130 using a known public key in cases in which the GNSS satellites 140 employ authentication techniques, such as Chimera, TESLA, or SCE.

In a third example, the base-station-location server 264 audits and authenticates locations of other neighboring base stations within the cellular network (e.g., other base stations that are physically located near the base station 120). The base-station-location server 264 directs the base station 120 to perform a cellular-network location service with the authenticated neighboring base stations. The base-station-location server 264 also receives, from the base station 120 or from the authenticated neighboring base stations, raw samples of the positioning reference signals 160 collected as part of the cellular-network location service. The authentication manager 308 determines the cellular-network location 510 of the base station 120 by analyzing these raw samples. By causing the cellular-network location service to be performed with other previously-authenticated base stations 120, the base-station-location server 264 decreases a probability that the raw samples of the positioning reference signals 160 are compromised by a counterfeit base station 162.

Sometimes the security key generator 310 provides the authenticated neighboring base stations with security keys 320 to encrypt timing and/or location information within the positioning reference signals 160. With this encryption, the authentication manager 308 can further audit the reported processed location 504 of the base station 120 by decrypting and authenticating the positioning reference signals 160. Using this technique, the authentication manager 308 establishes a closed-loop of communication from the base-station-location server 264, to each of the authenticated neighboring base stations, to the base station 120, and back to the base-station-location server 264.

In a fourth example, the base-station-location server 264 receives a measured location of the base station 120 from the base-station-tracking system 266. As described above with respect to FIG. 2, the base-station-tracking system 266 determines the location of the base station 120 using one or more sensors, such as a radar sensor or an optical sensor.

If the base station 120 is a stationary base station 120, the base-station-location server 264 can determine one of the locations of the base station 120 by referencing a previously-authenticated location of the base station 120. This previously-authenticated location can be stored by the base-station-location server 264 within the list of authenticated base stations 304.

Alternatively, if the base station 120 is a moving base station 120, the base-station-location server 264 can determine one of the locations of the base stations 120 based on the trajectory information 524, which is either previously stored by the base-station-location server 264 or provided by the base station 120. In some cases, the authentication manager 308 determines boundary conditions for the processed location 504 based on a range of possible locations within the trajectory information 524 or based on a set of rules determined based on the trajectory information 524. Example rules can include a maximum distance from a central location or a list of countries the base station 120 is permitted to traverse. As an example, the authentication manager 308 employs machine-learning techniques to determine the boundary conditions. Using this information, the authentication manager 308 can verify that the processed location 504 is within the boundary conditions.

To determine if the reported processed location 504 of the base station 120 is valid or invalid, the authentication manager 308 compares a locations derived above with the processed location 504 provided by the location message 512. If the comparison indicates that the locations are relatively similar (e.g., within an acceptable error-tolerance threshold), the base-station-location server 264 authenticates the processed location 504 of the base station 120. Otherwise, if the comparison indicates that the processed location 504 is significantly different from the determined location, the authentication manager 308 does not authenticate the processed location 504 of the base station 120. This can indicate that the base station 120 is compromised or that the base station 120 is a counterfeit base station 162, as described above.

To reduce a likelihood that the spoofing attack compromises both the processed location 504 and the location determined by the base-station-location server 264, the base-station-location server 264 can rely on information provided by a first source that differs from a second source relied upon by the base station 120 to determine the processed location 504. For example, if the base station 120 is a stationary base station that provides the surveyed location 506 as the processed location 504, the base-station-location server 264 can instead rely on raw samples of GNSS signals 130 collected by the co-located GNSS receiver 472 to independently determine the base station 120's location. As another example, if the base station 120 is a moving base station that provides the GNSS location 508 as the processed location 504, the base-station-location server 264 can instead rely on a measured location provided by the base-station-tracking system 266 to independently determine the base station 120's location.

The base-station-location server 264 can also increase a probability of detecting the spoofing attack by determining multiple locations of the base station 120 using information provided by multiple sources. In this way, the base-station-location server 264 performs multiple comparisons to determine if the processed location 504 is similar to the multiple locations determined by the base station 120. If one or more discrepancies are identified, the base-station-location server 264 does not authenticate the base station 120. Alternatively, if the processed location 504 is similar to the multiple locations determined by the base-station-location server 264, the base-station-location server 264 authenticates the base station 120. Generally, a probability of the base-station-location server 264 detecting the spoofing attack increases as a quantity of sources used by the base-station-location server 264 increases.

At 516, the authentication manager 308 updates the list of authenticated base stations 304 based on whether or not the processed location 504 is authenticated. If the processed location 504 is authenticated, the authentication manager adds the base station 120 to the list of authenticated base stations 304 or updates an existing entry regarding the newly-authenticated base station 120. Alternatively, if the processed location 504 of the base station 120 is not authenticated, the authentication manager 308 does not add the base station 120 to the list of authenticated base stations 304 updates an existing entry regarding the newly-non-authenticated base station 120. Consider, by way of example, that the base station 120 was previously authenticated by the base-station-location server 264. Accordingly, the base-station-location server 264 keeps the base station 120 listed in the list of authenticated base stations 304 if the processed location 504 is authenticated and removes the base station 120 from the list of authenticated base stations 304 if the processed location 504 is not authenticated.

At 518, the base-station-location server 264 generates one or more security keys 320 if the processed location 504 of the base station 120 is authenticated. In particular, the security key generator 310 can generate the key chain 330, the asymmetric keys 340, the symmetric keys 350, or a combination thereof.

At 520, the base-station-location server 264 sends, to the base station 120, an authentication message 522 with the one or more security keys 320, such as the security key 321. The base station 120 uses the security key 321 to encrypt a positioning reference signal 160, as further described with respect to FIG. 6.

Figure 6:
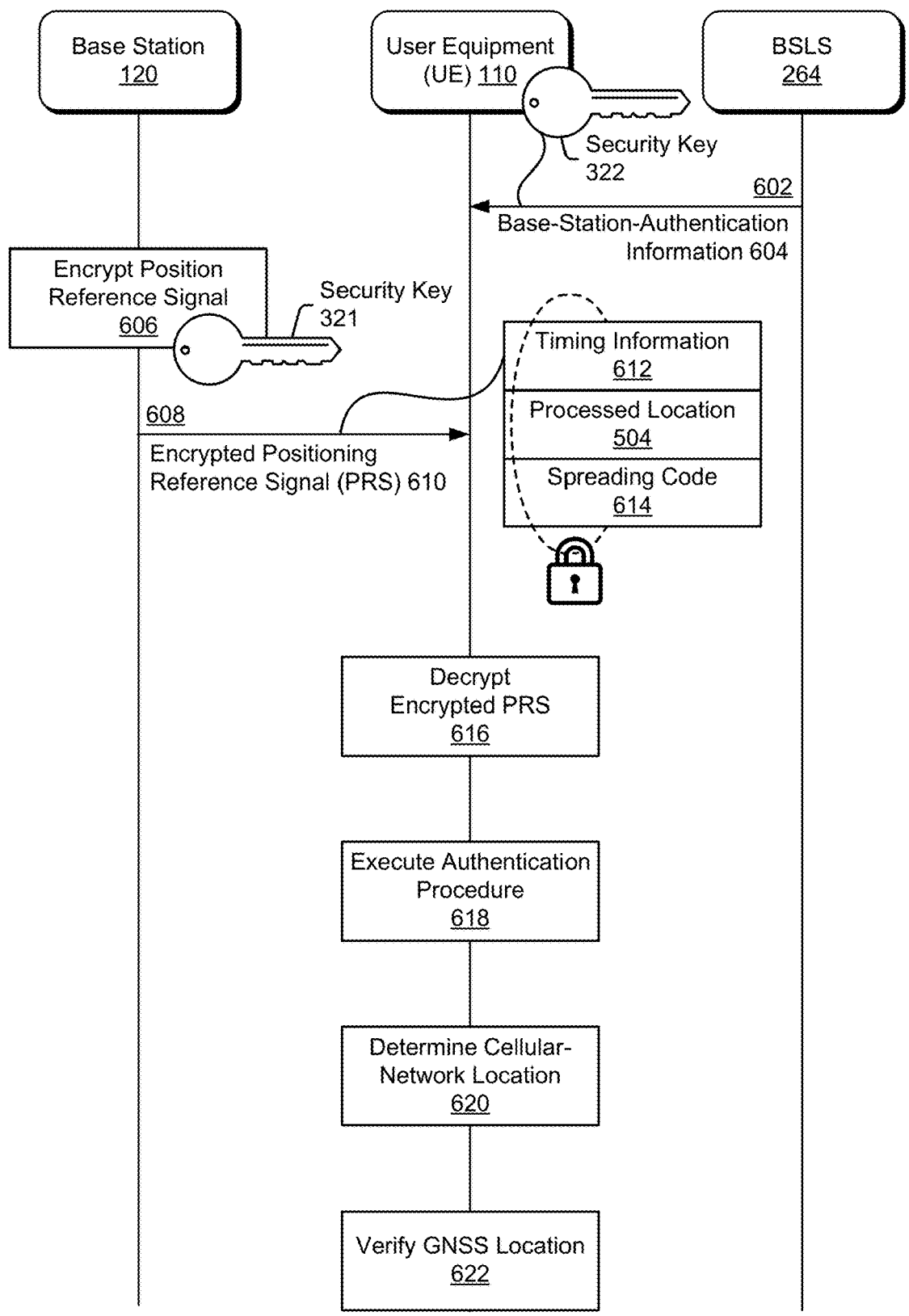
FIG. 6 illustrates additional details of example data transactions between a base station, a user equipment, and a base-station-location server for base station location authentication.

FIG. 6 illustrates details of example data transactions between the base station 120, the UE 110, and the base-station-location server 264 for base station location authentication. Optionally at 602, the base-station-location server 264 sends base-station-authentication information 604 to the UE 110. The base-station-authentication information 604 can include the security key 322, the list of authenticated base stations 304, or a combination thereof. The basestation-authentication information 604 enables the UE 110 to determine if the base station 120 is authenticated by the base-station-location server 264. Alternatively, the security key 322 is previously provided to the UE 110 by the network provider (e.g., previously stored in the integrated circuit 300 or the SIM 302).

At 606, the base station 120 encrypts a positioning reference signal 160 using the security key 321 provided by the base-station-location server 264 (at 520 in FIG. 5). The base station 120 encrypts the positioning reference signal 160 to protect information within the positioning reference signal 160. The base station 120 also encrypts the positioning reference signal 160 to relate the positioning reference signal 160 to the base-station-location server 264. This enables the UE 110 to confirm that the base station 120 is authenticated by the base-station-location server 264. The base station 120 can employ a variety of different types of cryptography, as further described below.

At 608, the base station 120 transmits an encrypted positioning reference signal 610 to the UE 110 to provide a cellular-network location service. In some situations, the base station 120 transmits the encrypted positioning reference signal 610 to multiple UEs 110 using a broadcast channel. In other situations, the base station 120 transmits the encrypted positioning reference signal 610 as a radio-link channel (RLC) message or as an over-the-top message.

Depending on the type of cellular-network location service, the encrypted positioning reference signal 610 can include timing information 612, the processed location 504 of the base station 120, and/or a spreading code 614. The timing information 612 can include a time stamp indicating a time at which a frame boundary of the encrypted positioning reference signal 610 is transmitted. Similar to GNSS techniques, the spreading code 614 can enable the UE 110 to determine the distance to the base station 120. Although not explicitly shown, the encrypted positioning reference signal 610 can also include locations of other neighboring base stations or an identity of the base station 120.

At 616, the UE 110 decrypts the encrypted positioning reference signal 610 to determine the timing information 612 or the processed location 504. The UE 110 generates measurement data for the cellular-network location service based on the decrypted information. In some cases, the UE 110 uses the security key 322 that is previously provided by the base-station-location server 264 or stored in the IC 300 (e.g., the SIM 302) to decrypt the encrypted positioning reference signal 610. In other cases, the UE 110 uses the security key 321 that is released by the base station 120 at a later time. As such, there can be a delay between when the UE 110 receives the encrypted positioning reference signal 610 and when the UE 110 decrypts the encrypted positioning reference signal 610. Generally, the UE 110 decrypts the encrypted positioning reference signal 610 using a security key that is received prior to or after the transmission of the encrypted positioning reference signal 610.

At 618, the UE 110 executes an authentication procedure to determine that the base station 120 is authenticated by the base-station-location server 264. The authentication procedure can be performed in a variety of different ways based on the cryptography employed by the base station at 602, such as those that verify a message authentication code, verify a digital signature, employ a one-way function (e.g., a cryptographic hash function), associated with one or more authentication techniques used in Chimera, one or more authentication techniques used in TESLA, one or more authentication techniques used in SCE, or combinations thereof. In some cases, the UE 110 can additionally verify that the base station 120 is included within the list of authenticated base stations 304. Some example encryption and authentication techniques are described in further detail below.

In a first example, the base station 120 uses the security key 321 to generate a digital signature or a message authentication code (MAC). The digital signature or the MAC is included within the encrypted positioning reference signal 610, and the UE 110 verifies the digital signal or the MAC using the security key 322.

In a second example, the base station 120 uses the security key 321 to encrypt the spreading code 614. The UE 110 verifies the encryption of the spreading code 614 using the security key 322.

In a third example, the security key 321 is a key of the key chain 330. As the base station 120 transmits multiple encrypted positioning reference signals 610 over time, the keys of the key chain 330 are released from the base-station-location server 264 to the base station 120, and therefore from the base station 120 to the UE 110, in a reverse order relative to an order in which the keys were generated by the security key generator 310. The UE 110 can therefore authenticate a previous encrypted positioning reference signal 610 by applying the one-way function to a key that is included in a last encrypted positioning reference signal 610 (e.g., the key $K_1$ 331 or the key $K_2$ 332) to derive a key that is included within the previous encrypted positioning reference signal 610 (e.g., the key $K_L$, 333).

In a fourth example, the base station 120 generates ciphertext (e.g., a sequence of binary numbers) based on the security key 321. The base station 120 punctures or distributes bits of the ciphertext throughout the spreading code 614, thereby modifying the spreading code 614. The UE 110 derives the ciphertext using the security key 322 and verifies that the ciphertext observed within the spreading code 614 correlates with the derived ciphertext. In some cases, the ciphertext can also be generated based on data that is included within the encrypted positioning reference signal 610. In this manner, the security key 321 binds the spreading code 614 and the data (e.g., the timing information 612 and/or the processed location 504) together.

At 620, the UE 110 determines its cellular-network location. In particular, the location module 416 analyzes the information contained within the encrypted positioning reference signal 610 and generates measurement data based on the information. Depending on the type of cellular-network location service, the UE 110 can provide the measurement data to another entity (e.g., the base station 120 or a server), which computes the cellular-network location and provides the cellular-network location to the UE 110. Alternatively, the UE 110 can determine the cellular-network location itself using the measurement data and other measurement data generated from other encrypted positioning reference signals 610 that are received from other authenticated neighboring base stations.

At 622, the UE 110 optionally verifies its GNSS location based on the cellular-network location. With base station location authentication, the cellular-network location is likely to be accurate and not substantially impacted by a spoofing attack. Therefore, the UE 110 can use the cellular-network location to verify the GNSS location (e.g., determine if the GNSS location is consistent with the cellular-network location).

Example Method

Figure 7:
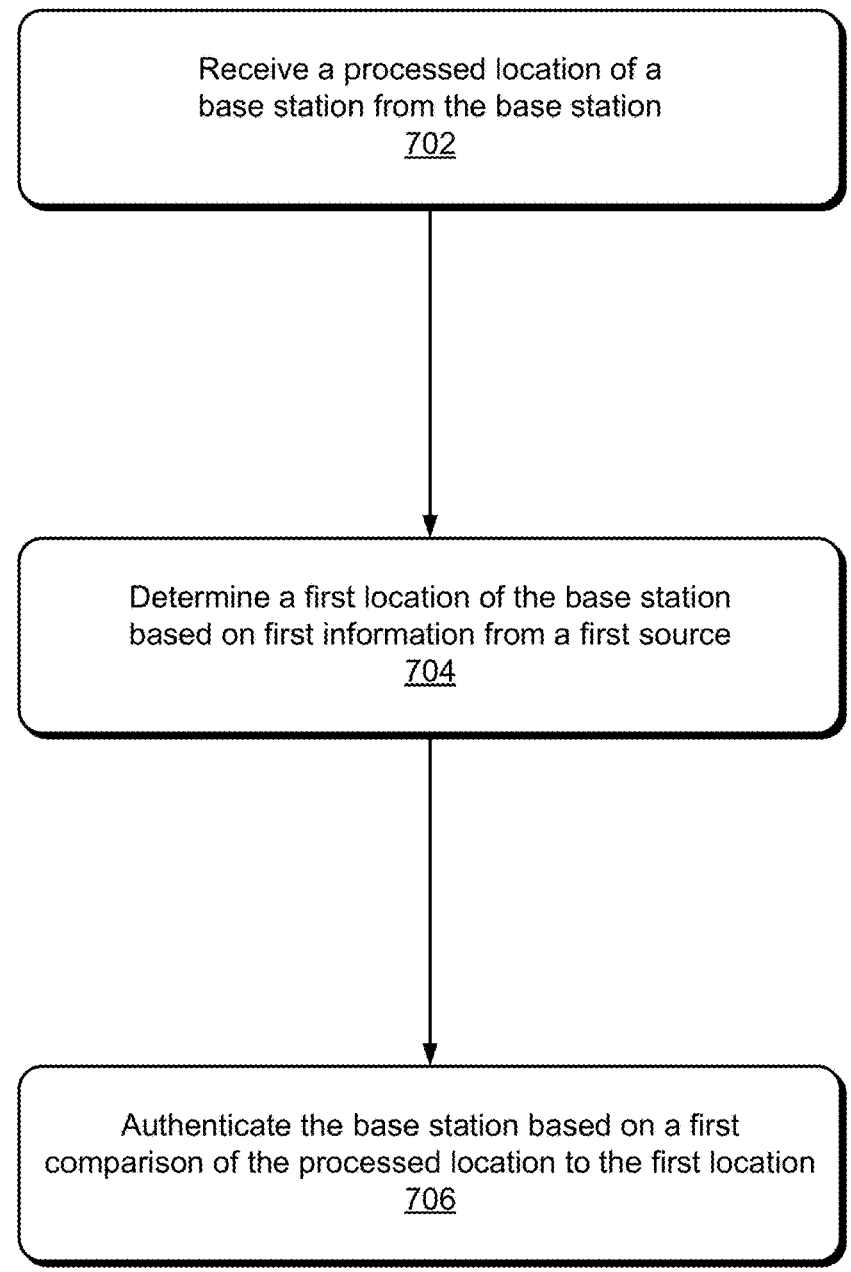
FIG. 7 illustrates an example method for base station location authentication.

FIG. 7 depicts an example method 700 for base station location authentication. Method 700 is shown as a set of operations (or acts) performed but not necessarily limited to the order or combinations in which the operations are illustrated. Further, any of one or more of the operations may be repeated, combined, reorganized, or linked to provide a wide array of additional and/or alternate methods. In portions of the following discussion, reference may be made to environments 100 and 200 of FIGS. 1 and 2, and entities detailed in FIGS. 3 and 4, reference to which is made for example only. The techniques are not limited to performance by one entity or multiple entities operating on one device.

At 702, a base-station-location server receives a processed location of a base station from the base station. For example, the base-station-location server 264 receives the location message 512 from the base station 120, as shown in FIG. 5. The location message 512 includes the processed location 504, which the base station 120 determines based on a stored surveyed location 506, using GNSS techniques that generate a GNSS location 508, or using a cellular-network location service that generates a cellular-network location 510.

At 704, the base-station-location server 264 determines a first location of the base station based on first information from a first source. For example, the authentication manager 308 determines the first location of the base station 120 based on the first information from the first source. The first information and the first source can include: a surveyed location stored by the base-station-location server 264, raw samples of the GNSS signals 130 provided by the GNSS receiver 472, raw samples of positioning reference signals 160 received by the base station 120 or authenticated neighboring base stations, a measured location provided by the base-station-tracking system 266, a previously-authenticated location of the base station 120 provided by the base-station-location server 264, or the trajectory information 524 provided by the authorized person or the base station 120. Sometimes the base station 120 passes the information from the source to the base-station-location server 264.

At 706, the base-station-location server 264 authenticates the base station 120 based on a first comparison of the processed location to the first location. For example, the authentication manager 308 performs this comparison and authenticates the base station 120 if the processed location 504 and the first location are relatively similar (e.g., within a predetermined error-tolerance threshold). Alternatively, the authentication manager 308 does not authenticate the base station 120 if the comparison indicates that the processed location 504 is substantially different from the first location. The base-station-location server 264 can perform additional comparisons based on other locations derived from information provided by other sources. By using data from multiple sources, the base-station-location server 264 can detect a spoofing attack that may have compromised the processed location 504 provided by the base station 120 or information provided to the base-station-location server 264 from one of the sources.

CONCLUSION

Although techniques for base station location authentication have been described in language specific to features and/or methods, it is to be understood that the subject of the appended claims is not necessarily limited to the specific features or methods described. Rather, the specific features and methods are disclosed as example implementations of base station location authentication.

What is claimed is:

1. A method for a base-station-location server, the method comprising the base-station-location server:
receiving, from a base station, a processed location of the base station, the processed location determined by the base station;
accepting first information determined by a first source, the first source distinct from the base station;
determining, independently of the processed location, a first location of the base station based on the first information; and
authenticating the base station based on a first comparison of the processed location to the first location.

2. The method of claim 1, wherein the processed location comprises:
a surveyed location of the base station;
a Global Navigation Satellite System (GNSS) location of the base station; or
a cellular-network location of the base station.

3. The method of claim 1, wherein:
the first source comprises a Global Navigation Satellite System (GNSS) receiver co-located with the base station; and
the first information comprises raw samples of one or more GNSS signals received by the GNSS receiver, wherein the processed location is not based on the raw samples of one or more GNSS signals received by the GNSS receiver.

4. The method of claim 3, further comprising:
receiving the raw samples directly from the GNSS receiver or indirectly from the GNSS receiver through the base station;
obtaining a public key associated with the GNSS signals; and
authenticating the raw samples using the public key, wherein the determining of the first location is responsive to the authenticating of the raw samples.

5. The method of claim 1, further comprising:
receiving raw samples of one or more encrypted positioning reference signals from the base station, the one or more encrypted positioning reference signals transmitted by one or more previously-authenticated neighboring base stations, wherein:
the first source comprises the one or more previously-authenticated neighboring base station; and
the first information comprises the raw samples of the one or more encrypted positioning reference signals received by the base station.

6. The method of claim 5, further comprising:
generating a security key;
establishing a secure communication with the one or more previously-authenticated neighboring base stations;
communicating the security key to the one or more previously-authenticated neighboring base stations to enable the one or more previously-authenticated neighboring base stations to generate the one or more encrypted positioning reference signals; and
authenticating the raw samples using the security key, wherein the determining of the first location is responsive to the authenticating of the raw samples.

7. The method of claim 1, further comprising:
receiving a measured location of the base station from a base-station-tracking system, wherein:
the first source includes the base-station-tracking system; and the first information includes the measured location of the base station.

8. The method of claim 1, further comprising:
determining a second location of the base station based on second information from a second source; and
authenticating the base station based on the first comparison of the processed location to the first location and a second comparison of the processed location to the second location.

9. The method of claim 8, further comprising:
storing a surveyed location of the base station, wherein:
the first source or the second source includes the base-station-location server; and
the first information or the second information includes the surveyed location of the base station.

10. The method of claim 1, further comprising:
receiving trajectory information from the base station, the base station comprising a moving base station;
determining, based on the trajectory information, boundary conditions that define possible locations of the base station; and
verifying that the processed location is within the boundary conditions,
wherein the authenticating of the base station is responsive to the verifying of the processed location.

11. The method of claim 1, further comprising:
adding the base station to a list of authenticated base stations;
generating a first security key; and
sending the first security key to the base station to enable the base station to encrypt a first positioning reference signal to provide a cellular-network location service for one or more user equipment (UE).

12. The method of claim 10, further comprising:
receiving a second processed location of the base station from the base station;
determining a third location of the base station based on third information from the first source; and
determining whether or not to authenticate the base station based on a third comparison of the second processed location to the third location.

13. The method of claim 11, further comprising:
determining to not authenticate the base station based on the third comparison; and
removing the base station from the list of authenticated base stations.

14. A base station configured to:
determine a processed location of the base station;
communicate the processed location to a base-station-location server;
receive a security key from the base-station-location server;
generate an encrypted positioning reference signal using the security key; and
transmit the encrypted positioning reference signal to one or more user equipment (UE) to provide a cellular-network location service.

15. The base station of claim 14, further configured to:
accept raw samples of one or more GNSS signals from a GNSS receiver co-located with the base station; and
communicate the raw samples to the base-station location server to enable the base-station location server to authenticate the processed location.

16. The base station of claim 14, wherein the base station is configured to perform at least one of the following to generate the encrypted positioning reference signal:
encrypt a spreading code using the security key and include the spreading code within the encrypted positioning reference signal;
generate a digital signature using the security key and include the digital signature within the encrypted positioning reference signal;
include a previous security key used to encrypt a previous encrypted positioning reference signal within the encrypted positioning reference signal;
generate ciphertext using the security key and puncture the spreading code with the ciphertext; or
generate a message authentication code using the security key and include the message authentication code within the encrypted positioning reference signal.

17. The base station of claim 14, wherein the base station is configured to determine the processed location based on at least one of the following:
a surveyed location of the base station that is stored by a computer-readable storage media of the base station;
a Global Navigation Satellite System (GNSS) signal received by a GNSS receiver co-located with the base station; or
a positioning reference signal received from a neighboring base station.

18. A user equipment (UE), the UE configured to:
establish a secure communication with a base-station-location server;
receive base-station-authentication information from the base-station-location server;
receive encrypted information from a base station as part of a cellular-network location service;
determine that the base station is authenticated by the base-station-location server based on the base-station-authentication information; and
responsive to a determination that the base station is authenticated, determine a cellular-network location of the UE based on the encrypted information.

19. The UE of claim 18, wherein:
the base-station-authentication information comprises at least one of the following:
a security key; or
a list of authenticated base stations; and
the encrypted information comprises at least one of the following:
encrypted timing information of the base station; or
an encrypted processed location of the base station.

20. The UE of claim 18, wherein:
the UE includes a Global Navigation Satellite System (GNSS) receiver and is configured to determine a GNSS location of the UE using the GNSS receiver; and
the UE is configured to verify the GNSS location based on a comparison between the GNSS location and the cellular-network location.

* * * * *